No. 689,727. Patented Dec. 24, 1901.
C. E. KESTER & C. R. MOORE.
BEARING ADJUSTER FOR CONNECTING RODS.
(Application filed May 13, 1901.)
(No Model.) 2 Sheets—Sheet I.
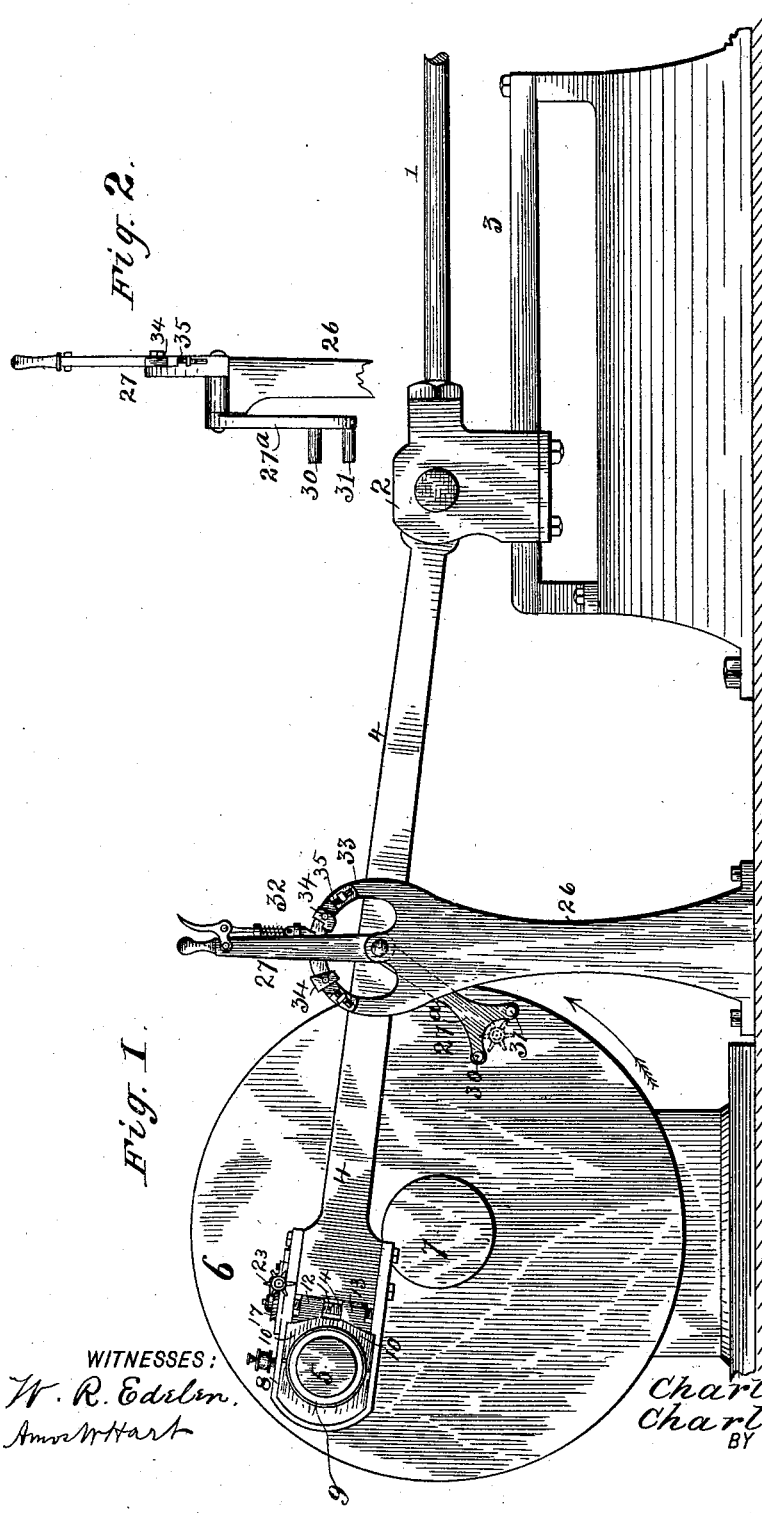
WITNESSES:
W. R. Edelen.
Amos W Hart
INVENTORS.
Charles E. Kester
Charles R. Moore.
BY
ATTORNEYS No. 689,727. Patented Dec. 24, 1901.
C. E. KESTER & C. R. MOORE.
BEARING ADJUSTER FOR CONNECTING RODS.
(Application filed May 13, 1901.)
(No Model.) 2 Sheets—Sheet 2.
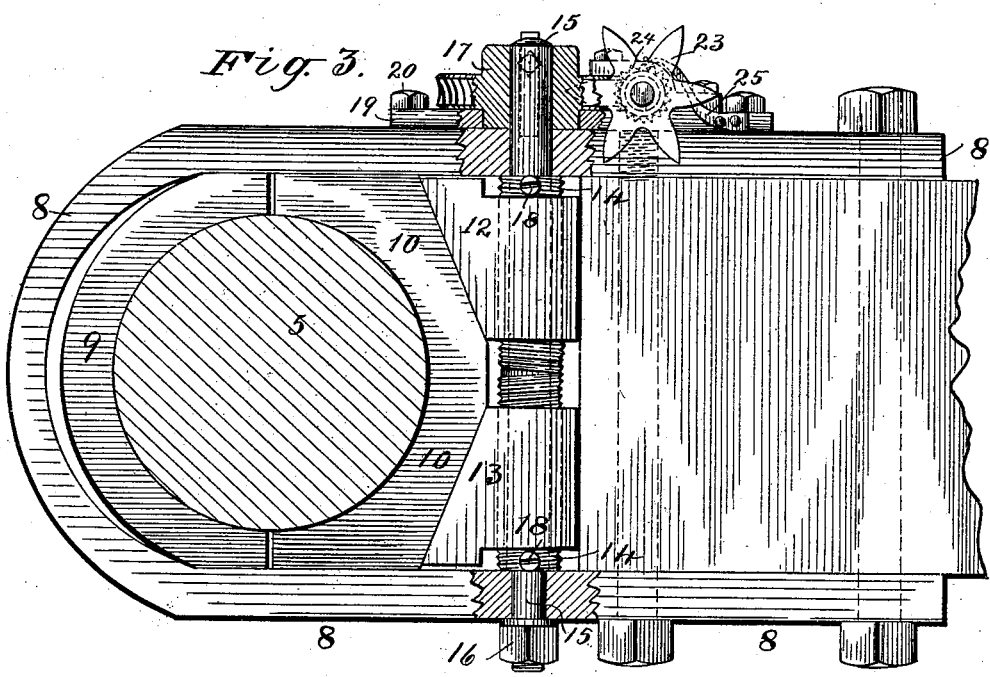
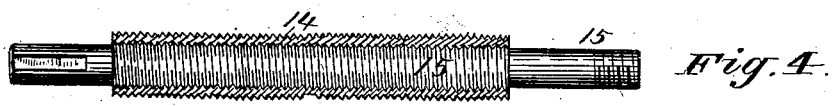
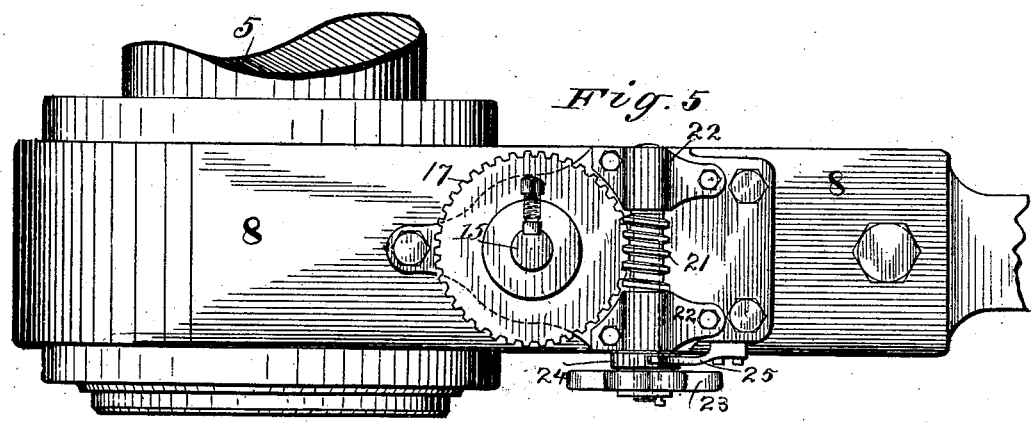
WITNESSES: INVENTORS.
Charles E. Kester.
Charles R. Moore.
BY
ATTORNEYS

UNITED STATES PATENT OFFICE.

CHARLES E. KESTER AND CHARLES R. MOORE, OF HILLSBORO, ILLINOIS.

BEARING-ADJUSTER FOR CONNECTING-RODS.

SPECIFICATION forming part of Letters Patent No. 689,727, dated December 24, 1901.

Application filed May 13, 1901. Serial No. 60,005. (No model.)

*To all whom it may concern:*

Be it known that we, CHARLES E. KESTER and CHARLES R. MOORE, citizens of the United States, and residents of Hillsboro, in the county of Montgomery and State of Illinois, have made certain new and useful Improvements in Bearing-Adjusters for Connecting-Rods, of which the following is a specification.

A gib and key—that is to say, a fixed wedge and driving-wedge—are usually employed for tightening the strap holding the brasses which constitute the bearing of a connecting-rod on the wrist-pin of an engine-crank. To adjust such bearing requires that the engine shall be stopped, and since such adjustment must be made quite frequently and consumes considerable time a corresponding expense is involved, especially in large establishments. Our invention enables the adjustment to be made without stopping the engine or reducing its load or speed. If the bearing becomes too warm, it can be slacked off a little, or if it bumps excessively the bearing may be tightened by the simple adjustment of a hand-lever under the control of the engineer.

In constructing our improved adjustable bearing we employ two wedges, which work in frictional contact with inclined surfaces on one of the halves of the bearing, and by adjusting such wedges toward or from each other the bearing proper is tightened or loosened, as required. The wedges are moved simultaneously by a screw-shaft and worm-gear, and the latter is acted upon by a wiper or trip-wheel which is rotated intermittently or stepwise by the lever mechanism controlled by the engineer.

The details of construction, combination, and operation of parts are as hereinafter described, and shown in the accompanying drawings, in which—

Figure 1 is a side view illustrating the application of our invention to an engine-crank. Fig. 2 is a detail view of the lever controlled by the engineer. Fig. 3 is an enlarged section of the bearing of the connecting-rod constructed according to our invention. Fig. 4 is a partly-sectional view of the solid and hollow screws for adjusting the edges of the bearing. Fig. 5 is a plan view of the parts shown in Fig. 3.

As shown in Fig. 1, the numeral 1 indicates the piston-rod of an engine, the same being connected with a cross-head 2, that slides upon guides 3. The said cross-head 2 is connected with the crank-pin 5 by means of a connecting-rod 4, to which our improved bearing is applied. The crank-pin 5 projects from a disk or crank 6, keyed upon the engine-shaft 7.

The bearing is provided with the usual strap 8, within which are arranged two half-boxes 9 10. The half 10 sets close to the outer one 9 and is provided with opposite inclines on its outer side. The wedges 12 and 13 (see Fig. 3) work in frictional contact with such inclines of the half 10 and are adjusted simultaneously toward or from each other by means of a solid and hollow screw, whose construction and arrangement are as follows: The wedges 12 and 13 are preferably of the same width as the strap 8. One of them is threaded interiorly with a right-hand thread and the other with a left-hand thread. A tubular screw 14, Fig. 4, is screwed into these wedges and has a single continuous thread inside, as shown in Fig. 4. The ends of the screw 15 are made cylindrical and project through the sides of the strap 8. A nut 16 is screwed on the lower end, and a worm-wheel 17 is keyed on its upper end. The screw 15 thus constitutes practically a screw-shaft having its bearings in the strap 8. It is apparent that the opposite exterior threads on the hollow screw 14 correspond to and are adapted to work in the respective threads of the wedges 12 and 13, and consequently when the said screw 14 is rotated the wedges will move simultaneously toward or from each other. The shell or tubular screw 14 abuts the inner side of the strap 8 and is secured to the solid screw 15 by means of pins or screws 18, which pass through both parts. To restate the arrangement, the length of the tubular screw 14 is the distance between the upper and lower parts of the strap, and one wedge 12 is screwed on one end of the same and the other wedge 13 is screwed on the other end. The ends of the wedges are cut away to accommodate the securing-screws 18.

The worm-wheel 17 is bedded in a cap-plate 19, secured to strap 8 by screws 20. The diameter of wheel 17 is nearly the width of the strap 8. It meshes with a worm-shaft 21, arranged transversely on the cap-plate 19 and having bearings 22, which are secured to the latter. On one end of the worm-shaft 21 is keyed a star or wiper wheel 23, and adjacent to the latter is a circular ratchet 24, with which a spring-pawl 25 engages. Said pawl is secured to cap-plate 19 and made V-shaped at its free end, so that it has frictional engagement with the ratchet and is adapted to slide on the latter either way when the shaft 21 is rotated. The pawl obviously serves to lock the shaft and worm 17, so that they are immovable save when the trip-wheel 23 is acted upon. The means for thus acting on the trip-wheel are illustrated in Figs. 1 and 2—that is to say, upon a standard 26, arranged vertically in proximity to the crank or disk 6, is pivoted a hand-lever 27, having an arm 27ª, arranged at an obtuse angle thereto. The free lower end of said arm carries two pins 30 and 31, which project laterally, as shown in Fig. 2. As illustrated in Fig. 1, the lever-arm 27ª is in the path of the trip-wheel 23, and, as shown by dotted lines, the said wheel passes between the pins 30 31 when the lever 27 is set in its mid position. The lever is provided with a locking-dog 32, by which it is locked to the quadrant 33. Stops 34 limit the lateral movement of the lever in both directions. These blocks may be adjusted by means of a screw 35 to provide for greater or less play of the lever 27. When the lever 27 is set vertical, (as shown,) the trip-wheel 23 is not acted on by the pins 30 31, and consequently the bearing of the connecting-rod remains the same or in the same position as it was originally set. If, however, it be desired to tighten or loosen the bearing, the engineer shifts the lever 27 to the right or left, as the case may be, and thereby throws the pin 30 or the pin 31 into contact with the trip-wheel 23, and thereby rotates the latter to the right or left. It is thus obviously practicable for the engineer to adjust the bearing as required while the engine is in motion by a simple movement of the lever 27.

If the position of the connecting-rod relative to the base is changed by putting in liners or washers, &c., for wear, the movement of the pins or fingers 30 31 of the lever-arm 27ª can be adjusted by moving the stops 34 and the quadrant 33.

By using two wedges arranged and operated as described the strap is mainly relieved of strain, which is taken up by the screw-shaft. In brief, by using two wedges one balances the other in effect on the rod and strap. The wedges can be moved one-thousandth of an inch, which is a very fine adjustment.

When the star or wiper wheel 23 is engaged to make an adjustment of the wedges, it is done just before compression begins or from the point where the crank-pin travels from the last quarter of the stroke to back center.

There is hence no pressure on the wedges, and they may be therefore very easily moved.

It is to be understood that our invention is applicable to any bearing where adjustable parts are employed.

What we claim is—

1. In a bearing-adjuster of the class described, the combination with a connecting-rod and the wrist-pin of an engine crank or cross-head, of an adjustable half-box, wedges adapted to act thereon and threaded interiorly right and left, a screw-shaft having reverse threads for engaging the wedges and means for rotating such shaft substantially as shown and described.

2. In a bearing-adjuster of the class described, the combination with a connecting-rod and the wrist-pin of an engine crank or cross-head, of an adjustable half-box, wedges adapted to act thereon and threaded interiorly right and left, a screw-shaft working in said wedges, gearing for rotating the shaft in either direction and a tappet or trip device arranged in the path of said gearing and adapted to trip the same, for moving the wedges simultaneously toward or from each other, as required to tighten or loosen the bearing substantially as shown and described.

3. In a bearing-adjuster of the class described, the combination with a connecting-rod and the wrist-pin of an engine crank or cross-head, of an adjustable brass half-box, wedges adapted to act thereon and threaded interiorly right and left, a screw-shaft working in said wedges, gearing for rotating the said shaft and having a trip-wheel arranged as described, a tripping device arranged in the path of the said wheel and having two opposite parts adapted to engage the wheel on either side, and means for adjusting said tripping device for shifting the trip-wheel and thereby the wedges in either direction substantially as shown and described.

4. In a bearing-adjuster of the class described, the combination with a connecting-rod and the wrist-pin of an engine crank or cross-head of an adjustable half-box, wedges adapted to act thereon and threaded interiorly right and left, a screw-shaft working in said wedges, a worm-wheel applied thereto, a worm-shaft meshing with said wheel, a star trip-wheel and ratchet fixed on said worm-shaft, a pawl adapted to engage said ratchet, a lever pivoted adjacent to the connecting-rod and having an arm carrying lateral pins which may be brought into the path of the said trip-wheel for rotating it intermittently or stepwise in either direction, as required for adjusting the wedges in either direction for tightening or loosening the bearing substantially as shown and described.

5. In a bearing-adjuster of the class described, the combination of a connecting-rod, wrist-pin, half-boxes, wedges and screw-shaft operating the said wedges, the worm-wheel, worm-shaft, trip-wheel and lever having an arm carrying lateral pins for engaging said trip-wheel as the crank rotates, and adjustable stops for limiting the throw of the lever, substantially as shown and described.

6. In a bearing-adjuster of the class described, the combination with a strap and boxes, of wedges coacting with said boxes and threaded right and left interiorly, a hollow screw having right and left screw-threads on its respective end portions, a screw-shaft which passes through such hollow screw, means for locking the two screws together the hollow screw abutting the inner sides of the strap and the solid screw having its bearings in the latter, and means for rotating the compound screw-shaft substantially as shown and described.

CHARLES E. KESTER.
CHARLES R. MOORE.

Witnesses:
HENRY R. CRAWFORD,
J. J. FREY.